United States Patent

[11] 3,613,717

| [72] | Inventor | Robert Harvey Smith<br>Warren, Mich. |
|---|---|---|
| [21] | Appl. No. | 38,999 |
| [22] | Filed | May 20, 1970 |
| [45] | Patented | Oct. 19, 1971 |
| [73] | Assignee | Sperry Rand Corporation<br>Troy, Mich. |

[54] REMOTE ELECTRICALLY MODULATED RELIEF VALVE
13 Claims, 1 Drawing Fig.

[52] U.S. Cl. .................................................. 137/491,
137/85, 137/625.61, 137/625.64
[51] Int. Cl. .................................................. F16k 31/12
[50] Field of Search .......................................... 137/489, 491

[56] References Cited
UNITED STATES PATENTS

| 3,181,559 | 5/1965 | Hipple ..................... | 137/489 |
| 3,212,523 | 10/1965 | Martin ..................... | 137/491 X |
| 3,454,038 | 7/1969 | Katchko ................... | 137/489 |

*Primary Examiner*—Harold W. Weakley
*Attorney*—Barnes, Kisselle, Raisch & Choate

ABSTRACT: A remote electrically modulated relief valve comprising a main stage valve, a pilot stage valve, and a control stage. The pilot stage is responsive to the pressure through the main stage and includes spring loading operable upon exceeding a predetermined pressure to actuate hydraulically the main stage. The control stage hydraulically varies the spring loading on the pilot stage in accordance with an electrical signal that is supplied thereto to vary the pressure at which the pilot stage will function to operate the main stage.

PATENTED OCT 19 1971
3,613,717
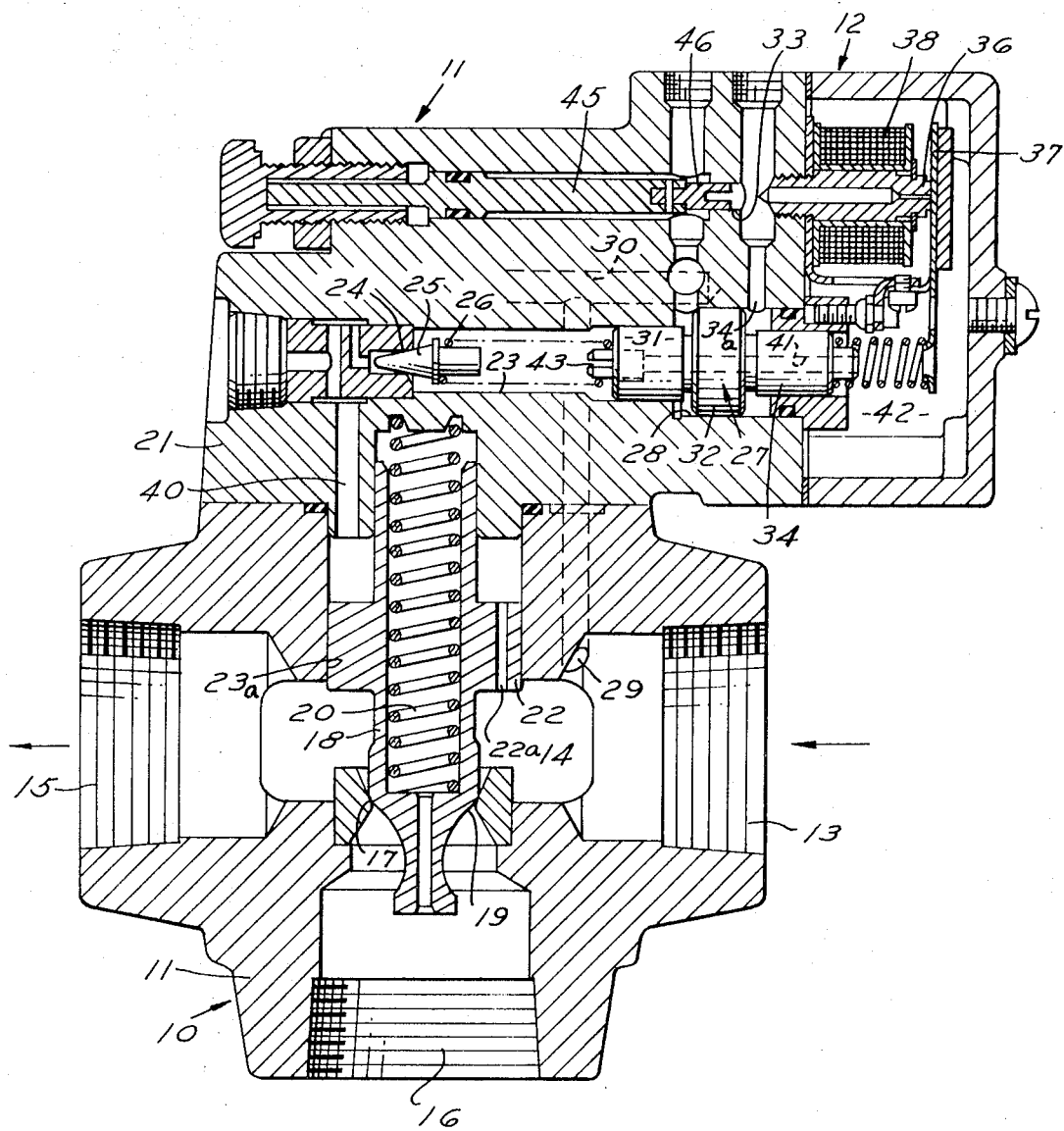
INVENTOR
ROBERT H. SMITH
BY
Barnes, Kisselle, Raisch & Choate.
ATTORNEYS 3,613,717

REMOTE ELECTRICALLY MODULATED RELIEF VALVE

This invention relates to hydraulic relief valves and particularly to pilot operated hydraulic relief valves.

BACKGROUND OF THE INVENTION

In pressure relief valves, it has heretofore been known to provide a pilot valve or stage in association therewith to control the main valve and thereby eliminate chattering and vibration. Such a liquid relief valve is disclosed and claimed in the U.S. Pat. to Vickers, No. 2,043,453, issued June 9, 1936.

In the use of such a valve, it is often desirable to be able to vary the force or pressure at which the valve operates.

Accordingly, among the objects of the invention are to provide a remote electrically modulated relief valve; to provide such a valve which is relatively simple in construction, reliable and easy to manufacture; and to provide a remote electrically modulated pilot valve of novel construction.

SUMMARY OF THE INVENTION

A remote electrically modulated relief valve comprising a main stage valve, a pilot stage valve, and a control stage. The pilot stage is responsive to the pressure through the main stage and includes spring loading operable upon exceeding a predetermined pressure to actuate hydraulically the main stage. The control stage hydraulically varies the spring loading on the pilot stage in accordance with an electrical signal that is supplied thereto to vary the pressure at which the pilot stage will function to operate the main stage.

DESCRIPTION OF THE DRAWINGS

The single drawing is a longitudinal sectional view through a valve embodying the invention.

DESCRIPTION

Referring to the drawing, the remote electrically modulated relief valve embodying the invention comprises a main stage valve 10, a pilot stage valve 11, and a control stage 12.

As shown in the drawing, the main stage 10 comprises a body including an inlet 13 which extends to a passage 14 and an outlet 15, the hydraulic fluid being adapted to flow through inlet 13 through passage 14 and out outlet 15 to the device that is being operated such as a cylinder or the like. The body 11 further includes a bypass outlet 16 adjacent a valve seat 17. A valve member 18 includes a surface 19 that is yieldingly urged against the valve seat 17 by a spring 20 that is within the member 18 at one end and bottoms against a body 21 of the valve 11 at the other. Member 18 includes an integral piston 22 that rides in a cylinder 23a. Piston 23 has an axial passage 22a connecting opposed sides thereof.

The pilot stage 11 includes the body 21 which has a passage or bore 23 therein in which a valve seat 24 is provided. A pilot poppet valve 25 is yieldingly urged against the seat by a spring 26. One end of the spring 26 engages the valve 25 and the other end is engaged by a differential feedback plunger 27 that operates in an enlarged portion 28 of the bore 23 and includes a control piston 32 and end pistons 31, 34.

A bypass passage 29 is provided between the passage 14 and the bore 23. This, in turn, is connected by a passage 30 to the space between the one end piston 31 and central piston 32 of the plunger 27. The fluid also flows through an interconnecting passage 33 and passage 34a to the other side of the plunger 27 between the central piston 32 and the other end piston 34.

A portion of the fluid in the passage 34 passes outwardly through a flapper valve structure forming part of the control stage 12 and including a nozzle 36, flapper 37 and coil 38 which controls the piston of the flapper 37 with respect to the nozzle.

In order to compensate for increases in temperature in the area of the flapper valve, a temperature compensator rod 45 is provided and includes an orifice member 46 in the passage 33 supplying the side of the plunger 27 adjacent end piston 34. As the temperature in the area of the flapper valve increases, the portion 46 functions to restrict the flow of fluid entering that side of the plunger 27.

With zero current to the coil, system oil or hydraulic fluid will be flowing from inlet 13 over the main stage valve member 18 to outlet 15 at some minimum pressure. Quiescent oil will be flowing through passages 29, 30 across the pilot stage and through passage 33 across the pilot control stage. As current is applied to the coil, the flapper 37 is drawn toward the nozzle 36, restricting the flow from the nozzle. This builds up pressure which acts on the side 34 of the feedback plunger 27. This moves the plunger 27 toward the left acting on the pilot spring 26 which acts on the poppet 25. This builds up pressure, which acts on top of the valve member 18, building up system pressure.

The internal closed loop mechanism works as a position feedback device. As flow through the valve increases, system pressure will increase (this is referred to as steady-state pressure override). As system pressure increases, pressure on the right of plunger 27 also increases, thereby changing the force ratio acting on both sides of the feedback plunger 27. Any tendency for the plunger 27 to change position will affect the feedback spring 26, changing the position of the flapper 37 relative to the nozzle 36. This in turn affects the pressure to the right of plunger 27 and the system pressure and bringing the force ratio on the plunger back to its original value. This will keep the plunger near its original position regardless of flow.

As the oil temperature increases, the flow will increase due to a lower viscosity. Since the flapper force is held constant, the pressure to the right of plunger 27 will increase forcing the plunger to the left increasing the system pressure. However, as the temperature increases the aluminum rod 45 expands partially closing off the dropping orifice thereby restricting the amount of oil entering the right side of the plunger 27. This keeps system pressure rise to a minimum.

In operation, when zero current is flowing, the hydraulic fluid will pass from the inlet 13 around valve member 18 to the outlet 15. However, when the pressure exceeds a certain minimum, pilot valve 25 will move away from the seat 24 momentarily changing the pressure on the piston 22 through passage 40 causing the valve 18 to move away from its seat and dumping the fluid through the bypass outlet 16.

As shown, the area of the pilot valve 25 is drained through a passage 41 in the piston member 27 to the area 42 that is drained to the reservoir. One end of the passage 41 is formed with an orifice 43 thereby restricting the pressure override at high system pressures to an amount comparable to a conventional valve.

I claim:

1. A remote electrically modulated relief valve comprising a main stage valve adapted to be positioned in a flow passage and operable to bypass flow out of said passage, a pilot stage including a valve and a valve seat, spring means urging said valve against said valve seat, said pilot stage being responsive to the pressure of fluid in the main stage and operable upon exceeding a predetermined pressure to actuate hydraulically the main stage, said pilot stage including means for varying the force of the valve against the valve seat to thereby change the setting of the valve, a control stage, means for hydraulically varying the spring force of said spring means on the valve in said pilot stage, electrical means for varying and modulating the said last-mentioned means in response to a signal.

2. The combination set forth in claim 1 including feedback means responsive to the position of the hydraulically varying means for producing a null signal.

3. The combination set forth in claim 2 wherein said feedback means includes a spring.

4. The combination set forth in claim 1 wherein said hydraulically varying means comprises a differential pressure piston.

5. The combination set forth in claim 1 wherein said electrical means comprises a flapper valve including a body having an orifice therein, a flapper and an electrical winding controlling the position of said flapper with respect to said orifice.

6. The combination set forth in claim 1 including temperature-compensating means associated with said flapper valve for accommodating differential expansion of said flapper valve parts.

7. The combination set forth in claim 6 wherein said last-mentioned means includes an orifice, and means responsive to temperature for varying the size of said orifice.

8. A remote electrically modulated valve comprising a pilot stage including a valve and a valve seat, spring means urging said valve against said valve seat, said pilot stage including means for hydraulically varying the force of the spring means for forcing said valve against the valve seat to thereby change the setting of the valve, a control stage, electrical means for varying and modulating the said last-mentioned means in response to a signal.

9. The combination set forth in claim 8 including feedback means responsive to the position of the hydraulically varying means for producing a null signal.

10. The combination set forth in claim 8 wherein said hydraulically varying means comprises a differential pressure piston.

11. The combination set forth in claim 8 wherein said electrical means comprises a flapper valve including a body having an orifice therein, a flapper and an electrical winding controlling the position of said flapper with respect to said orifice.

12. The combination set forth in claim 8 including temperature-compensating means associated with said flapper valve for accommodating differential expansion of said flapper valve parts.

13. The combination set forth in claim 8 wherein said last-mentioned means includes an orifice, and means responsive to temperature for varying the size of said orifice.